United States Patent [19] [11] 4,097,431
Asahara et al. [45] Jun. 27, 1978

[54] AROMATIC COPOLYESTER COMPOSITION

[75] Inventors: Nakaba Asahara; Hiroyuki Takao, both of Uji; Kenji Yasue, Kyoto, all of Japan

[73] Assignee: Unitika Ltd., Amagasaki, Japan

[21] Appl. No.: 710,050

[22] Filed: Jul. 30, 1976

[30] Foreign Application Priority Data

Jul. 30, 1975 Japan ................................ 50-93300

[51] Int. Cl.$^2$ ............................................. C08G 63/02
[52] U.S. Cl. ........................... 260/22 R; 260/45.75 T; 260/45.75 W; 260/860; 260/863; 260/45.85 B
[58] Field of Search ................. 260/22 R, 45.8 R, 860, 260/863, 45.85, 45.75 T, 45.75 W

[56] References Cited

U.S. PATENT DOCUMENTS

| | | |
|---|---|---|
| 2,847,443 | 8/1958 | Hechenbleikner et al. .... 260/45.8 R |
| 2,999,823 | 9/1961 | Dombrow ........................ 260/45.7 P |
| 3,245,926 | 4/1966 | Parker ............................. 260/45.8 R |
| 3,281,381 | 10/1966 | Hechenbleikner et al. .... 260/45.8 R |
| 3,395,119 | 7/1968 | Blaschke et al. .................. 260/47 C |
| 3,829,394 | 8/1974 | Feiner et al. ..................... 260/45.7 P |
| 3,888,752 | 6/1975 | Eldred ............................. 260/45.8 R |
| 3,922,249 | 11/1975 | Mills ............................... 260/45.8 R |
| 3,946,091 | 3/1976 | Sakata et al. ......................... 260/860 |
| 3,975,358 | 8/1976 | Stretanski ....................... 260/45.8 R |

*Primary Examiner*—Ronald W. Griffin
*Attorney, Agent, or Firm*—Sughrue, Rothwell, Mion, Zinn and Macpeak

[57] ABSTRACT

An aromatic copolyester composition comprising (A) an aromatic copolyester derived from terephthalic acid, isophthalic acid and a bisphenol and (B) a phosphite compound, or an aromatic copolyester composition comprising components (A) and (B) plus (C) a metal salt of an organic carboxylic acid. Molded articles prepared from such aromatic copolyester compositions have superior mechanical properties and fire retardancy and reduced coloration and crazing.

29 Claims, No Drawings

AROMATIC COPOLYESTER COMPOSITION

FIELD OF THE INVENTION

This invention relates to a stabilized aromatic copolyester composition, more specifically, to a stabilized aromatic copolyester composition containing a phosphite compound.

DESCRIPTION OF THE PRIOR ART

The aromatic copolyester used in this invention is obtained from a mixture of terephthalic acid and/or functional derivatives thereof and isophthalic acid and/or functional derivatives thereof (with the terephthalic acid unit/isophthalic acid unit mole ratio being about 9:1 to about 1:9) and a bisphenol of the following general formula:

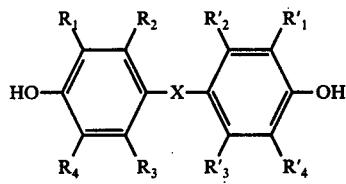

wherein —X— is selected from the group consisting of —O—, —S—, —SO$_2$—, —SO—, —CO—, and alkyl and alkylidene groups containing 1 to 4 carbon atoms, and R$_1$, R$_2$, R$_3$, R$_4$, R'$_1$, R'$_2$, R'$_3$ and R'$_4$ each represent a member of the group consisting of a hydrogen atom, a chlorine atom, a bromine atom and alkyl groups containing 1 to 4 carbon atoms, or functional derivatives thereof.

It is well known that such aromatic copolyesters have many superior properties, for example, superior mechanical properties such as tensile strength, bending strength, bending recovery, or impact strength, a high heat distortion temperature, and a high heat decomposition temperature, electrical properties such as inherent resistivity, dielectric breakdown strength, arc resistance or dielectric characteristics, good fire retardancy, good dimensional stability and good solvent resistance. Because of these properties, general molded articles, films, fibers and coating materials produced from the aromatic copolyesters by injection molding, extrusion molding, press molding, and other molding techniques are expected to have a wide range of utility.

Despite such superior properties and great utilitarian value, the aromatic copolyesters have the serious defect that when molded products made therefrom are left to stand for long periods of time in hot water or steam, they undergo crazing. Crazing is a phenomenon whereby a cloud or a network of fine cracks appears on the surface or in the interior of molded articles, and such a phenomenon has been reported in the literature and elsewhere. Crazing occurs wholly or partly in molded articles of aromatic copolyesters upon treatment in hot water or steam. The occurrence of crazing not only causes a loss of the transparency of the molded articles, but also renders them brittle. As a result, the impact strength and break elongation are reduced, and the molded articles easily break under bending stress or impact force.

Some methods are known in the art for preventing crazing in aromatic copolyester molded articles. Among them is a method in which polyethylene terephthalate is mixed, and the mixture is melted and formed into molded articles (see U.S. Pat. No. 3,946,091), and a method in which polyethylene-p-hydroxybenzoate is added. These prior art methods, however, suffer from the defect that the inherent superior fire retardancy of the aromatic copolyesters is reduced.

SUMMARY OF THE INVENTION

It is one object of this invention to reduce the crazing of molded articles made from aromatic copolyesters.

It is another object of this invention to provide aromatic copolyester compositions which can be formed into fabricated articles such as monofilaments, films, and various molded articles.

Other objects of this invention will become apparent as the description of this invention proceeds.

We performed extensive research in order to prevent the occurrence of crazing in molded articles of aromatic copolyesters while retaining their good fire retardancy. As a result, we found that the objects of this invention can be achieved by adding a phosphite compound of the general formula

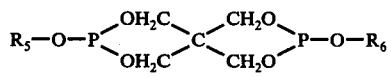

wherein R$_5$ and R$_6$, independently from each other, represent a hydrogen atom, an alkyl group having 1 to 22 carbon atoms, an aryl group having 6 to 16 carbon atoms, a cycloalkyl group having 6 to 12 carbon atoms, an arylalkyl group having 7 to 38 carbon atoms, an alkylaryl group having 7 to 38 carbon atoms, a polyhydric phenol residue having 7 to 38 carbon atoms and 1 to 2 hydroxyl groups remaining, or a polyhydric alcohol residue having 2 to 22 carbon atoms and 1 to 2 hydroxyl groups remaining, or such residues where at least one of the hydroxyl groups is in the form of a phosphite ester.

We also found that crazing can be prevented with more certainty by adding a metal salt of an organic carboxylic acid containing 2 to 22 carbon atoms (the metal being selected from metals of Groups I, II, III, and IV of the Periodic Table) to a resin composition comprising the aromatic copolyester and the phosphite compound.

Accordingly, the present invention provides a stabilized resin composition comprising (A) an aromatic copolyester derived from a mixture of terephthalic acid and isophthalic acid and/or functional derivatives thereof (the terephthalic acid unit/isophthalic acid unit molar ratio being about 9:1 to about 1:9) and a bisphenol of the following general formula

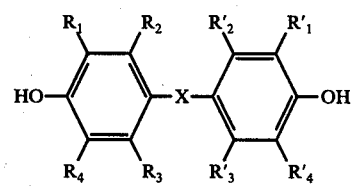

wherein —X— represents a member of the group consisting of —O—, —S—, —SO$_2$—, —SO—, —CO—, and alkylene and alkylidene groups containing 1 to 4 carbon atoms, and each of R$_1$, R$_2$, R$_3$, R$_4$, R'$_1$, R'$_2$, R'$_3$ and R'$_4$ is selected from the group consisting of a hydrogen atom, a chlorine atom, a bromine atom and alkyl groups containing 1 to 4 carbon atoms, or a derivative thereof, and (B) a phosphite compound of the general formula

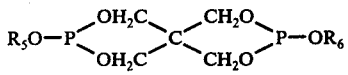

Wherein $R_5$ and $R_6$, independently from each other, represent a hydrogen atom, an alkyl group having 1 to 22 carbon atoms, an aryl group having 6 to 16 carbon atoms, a cycloalkyl group having 6 to 12 carbon atoms, an arylalkyl group having 7 to 38 carbon atoms, an alkylaryl group having 7 to 38 carbon atoms, a polyhydric phenol residue having 7 to 38 carbon atoms and 1 to 2 hydroxyl groups remaining, or a polyhydric alcohol residue having 2 to 22 carbon atoms and 1 to 2 hydroxyl groups remaining, or such residues where at least one of the hydroxyl groups is in the form of a phosphite ester.

The invention also provides a resin composition comprising components (A) and (B) plus component (C), a salt formed between an organic carboxylic acid containing 2 to 22 carbon atoms and a metal of Groups I, II, III, and IV of the Periodic Table.

When molded articles prepared from the compositions of this invention are placed in hot water or steam, the occurrence of crazing is unexpectedly prevented, and the articles retain good transparency, and exhibit a markedly improved retention of their desirable properties such as tensile strength, bending strength, and elongation at break.

DETAILED DESCRIPTION OF THE INVENTION

The aromatic copolyester used in this invention is obtained from a mixture of terephthalic acid and isophthalic acid and/or functional derivatives thereof (the terephthalic acid unit/isophthalic acid unit mole ratio being about 9:1 to about 1:9) and a bisphenol of the following general formula

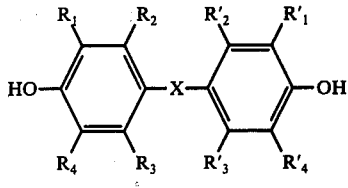

wherein —X— is selected from the group consisting of —O—, —S—, —SO$_2$—, —SO—, —CO—, and alkylene and alkylidene groups containing 1 to 4 carbon atoms, and each of $R_1$, $R_2$, $R_3$, $R_4$, $R'_1$, $R'_2$, $R'_3$ and $R'_4$ is selected from the group consisting of a hydrogen atom, a chlorine atom, a bromine atom and alkyl groups containing 1 to 4 carbon atoms, or a functional derivative thereof.

A mixture of about 90 to about 10 mole% of terephthalic acid and/or its functional derivatives and about 10 to about 90 mole% of isophthalic acid and/or its functional derivatives is used as an acid component to be reacted with the bisphenol to prepare the aromatic copolyester as referred to in this invention. Preferably, a mixture of 30 to 70 mole% of terephthalic acid and/or its functional derivatives and 70 to 30 mole% of isophthalic acid and/or its functional derivative is used. Aromatic copolyesters prepared from the bisphenols and a mixture of 50 mole% of terephthalic acid and/or its functional derivatives and 50 mole% of isophthalic acid and/or its functional derivatives is most preferred.

The molar ratio of bisphenol to the sum of the terephthalic acid groups and isophthalic acid groups is substantially equimolar.

The functional derivatives of terephthalic or isophthalic acid include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of these acids containing 1 to 6 (especially 1 to 2) carbon atoms in each alkyl moiety thereof. Preferred examples of diaryl esters include diphenyl terephthalate, diphenyl isophthalate.

Examples of the bisphenols of the above formula are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl) ethane, 2,2-bis(4-hydroxy-3-methylphenyl)propane, 2,2-bis (4-hydroxy-3-chlorophenyl)propane, 2,2-bis(4-hydroxy-3,5-dichlorophenyl)propane, 2,2-bis(4-hydroxy-3,5-dibromophenyl) propane, and 1,1-bis(4-hydroxyphenyl)-n-butane. 2,2-bis(4-hydroxyphenyl)propane, bisphenol A, is most typical and is easily available, and, accordingly, is most often used.

Typical examples of the functional derivatives of the bisphenols are their metal salts and diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more of them.

The aromatic copolyesters of this invention can be prepared by several methods. For example, an interfacial polycondensation can be used in which an aqueous alkaline solution of a bisphenol and a terephthaloyl dihalide-isophthaloyl dihalide mixture dissolved in a water-immiscible organic solvent are mixed and reacted. Typical interfacial polycondensation procedures are disclosed, for example, in W. M. Eareckson, J. Polymer Sci., XL 399 (1959), and Japanese Patent Publication No. 1959/1965.

According to a typical polycondensation procedure, the aqueous alkali solution of a bisphenol is added to the terephthaloyl dihalide-isophthaloyl dihalide mixture, preferably a terephthaloyl dichloride-isophthaloyl dichloride mixture, dissolved in an organic solvent, or an organic solvent solution of the terephthaloyl dihalide-isophthaloyl dihalide mixture is added to the aqueous alkaline solution of bisphenol and the system then is polymerized. Alternatively, the aqueous alkaline solution of bisphenol and the organic solvent solution of the terephthaloyl dihalide-isophthaloyl dihalide mixture can be simultaneously fed into a reaction vessel. Interfacial polycondensation takes place near the interface of the aqueous phase and the organic phase. However, since the aqueous phase and the organic phase are essentially immiscible, it is necessary to mutually disperse the phases; for this purpose, an agitator or a mixer such as a homomixer can be used.

The concentration of the terephthaloyl dihalide-isophthaloyl dihalide mixture dissolved in the organic solvent is usually about 2 to about 25% by weight, preferably 3 to 15% by weight. The concentration of the bisphenol in the aqueous alkaline solution is also usually about 2 to about 25% by weight, preferably 3 to 15% by weight.

The amounts of bisphenol and the terephthaloyl dihalide-isophthaloyl dihalide mixture are such that the molar ratio between them is preferably maintained equivalent. An excess of the terephthaloyl dihalide-isophthaloyl dihalide mixture is not desirable in the preparation of high molecular weight aromatic copolyesters.

Preferred alkalies are sodium hydroxide and potassium hydroxide. The concentration of the alkali in the aqueous solution can vary widely depending upon the reaction conditions, but is usually in the range of about 0.5 to about 10% by weight. Advantageously, the quantity of the alkali is nearly equivalent to the hydroxy groups of the bisphenol used or the alkali is present in a slight excess. The preferred molar ratio of the alkali to the hydroxy groups of the bisphenol is about 1:1 to about 1:2, preferably 1:1 to 1:1.1.

Hydrocarbons or halogenated hydrocarbons may be used as organic solvents for the terephthaloyl dihalide-isophthaloyl dihalide mixture. Examples of the organic solvents are methylene dichloride, chloroform, tetrachloromethane, 1,2-dichloroethane, 1,1,2-trichloroethane, tetrachloroethane, benzene and methylbenzene. Especially preferred are those which also dissolve the aromatic copolyesters produced. Methylene dichloride is the most preferred solvent.

The reaction temperature is not strictly limited, but usually it is preferably below about 40° C. Temperatures of 5° to 30° C are especially preferred.

The interfacial polymerization is usually performed at normal atmospheric pressure, and is completed in about 1 to 2 hours.

If desired, antioxidants, dispersing agents, catalysts and viscosity stabilizers can be added to the aqueous alkaline solution or to the reaction mixture. Typical examples of these additives are given below. Antioxidants include, for example, sodium hydrosulfite and sodium bisulfite. Examples of dispersing agents are anionic surface active agents such as sodium lauryl sulfate and octadecyl benzene sulfonate, cationic surface active agents such as cetyl trimethyl ammonium chloride, and nonionic surface active agents such as poly(ethylene oxide). Examples of catalysts include quaternary ammonium compounds such as trimethyl benzyl ammonium hydroxide, trimethyl benzyl ammonium chloride and triethyl benzyl ammonium chloride, tertiary sulfonium compounds such as dimethyl-2-hydroxyphenyl sulfonium chloride, quaternary phosphonium compounds such as triphenyl methyl phosphonium iodide, and quaternary arsonium compounds such as triphenyl methyl arsonium iodide and trimethyl octyl arsonium iodide. Tertiary amine compounds such as trimethyl amine, triethyl amine and benzyl dimethyl amine can also be used as catalysts. The viscosity stabilizers are, for example, monovalent compounds, particularly monohydric phenols such as o-phenyl phenol, p-phenyl phenol, m-cresol, tert-butylamine, and β-naphthol.

Another useful method for forming the aromatic copolyesters is by melt polymerization as disclosed, for example, in A. Conix, Ind. Eng. Chem., 51, 147 (1959), Japanese Patent Publication 15247/1963, and U.S. Pat. No. 3,395,119.

Melt polymerization can be performed, for example, by reacting an aliphatic carboxylic acid diester of the bisphenol with the terephthalic acid-isophthalic acid mixture at an elevated temperature under reduced pressure. A preferred diester of the bisphenol is the diacetate. Melt polymerization can also be carried out by reacting the bisphenol and a mixture of a diaryl ester of terephthalic acid and isophthalic acid while heating. A typical diaryl ester is the diphenyl ester. The reaction temperature employed is in the range of about 150 to about 350° C, preferably 180° to 320° C. The reaction pressure is usually varied in the course of the reaction from atmospheric pressure at the early stage of the reaction to reduced pressure, for example, below about 0.02 mmHg, towards the end of the reaction.

In the melt polymerization, the molar ratio of the bisphenol and the mixture of terephthalic acid-isophthalic acid components to prepare high molecular weight aromatic copolyesters must be maintained exactly equivalent.

A number of catalysts can be used, and preferred catalysts include titanium compounds such as butyl ortho-titanate and titanium dioxide. Other catalysts such as zinc oxide, lead oxide and diantimony trioxide can also be used.

Still another method for forming the copolyesters is solution polymerization in which the aromatic copolyesters are prepared by reacting the bisphenol with the terephthaloyl dihalide and isophthaloyl dihalide in an organic solvent. Useful solution polymerization procedures are disclosed, for example, in A. Conix, Ind. Eng. Chem., 51, 147 (1959), and U.S. Pat. No. 3,133,898.

In solution polymerization, the bisphenol and the mixture of a terephthaloyl dihalide, such as terephthaloyl dichloride, and an isophthaloyl dihalide, such as isophthaloyl dichloride, are usually mixed in equimolar proportions in an organic solvent, and the mixture is gradually heated to high temperatures of, for example, about 220° C. Preferably, the solvent used is one which also dissolves the aromatic copolyesters formed, such as dichloroethylbenzene. Usually, the reaction is carried out in the presence of a base to neutralize the hydrogen halide formed, for example, hydrogen chloride.

In order to insure the good physical properties of the aromatic copolyesters used in this invention, they should have a logarithmic viscosity ($\eta_{inh}$), defined by the following equation, of about 0.3 to about 1.0, preferably 0.4 to 0.8.

$$\eta_{inh} = \frac{\log_e t_1/t_2}{C}$$

wherein $t_1$ is the falling time (seconds) of the polymer solution; $t_2$ is the falling time (seconds) of the solvent; and C is the concentration (g/dl) of the polymer in the solution. The logarithmic viscosity, used herein, is determined in a 1,1,2,2-tetrachloroethane-phenol mixture (weight ratio: 4/6) at 25° C.

The phosphite compound used in the present invention is a phosphoric acid ester derivative of pentaerythritol represented by the following general formula:

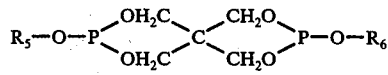

wherein $R_5$ and $R_6$, independently from each other, represent a hydrogen atom, an alkyl group having 1 to 22 carbon atoms, an aryl group having 6 to 16 carbon atoms, a cycloalkyl group having 6 to 12 carbon atoms, an arylalkyl group having 7 to 38 carbon atoms, an alkylaryl group having 7 to 38 carbon atoms, a polyhydric phenol residue having 7 to 38 carbon atoms and 1 to 2 hydroxyl groups remaining, or a polyhydric alcohol residue having 2 to 22 carbon atoms and 1 to 2 hydroxyl groups remaining, or such residues where at least one of the hydroxyl groups is in the form of a phosphite ester. Typical examples of the compounds of the above formula are

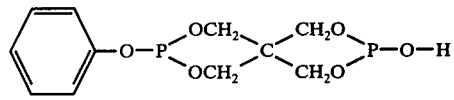

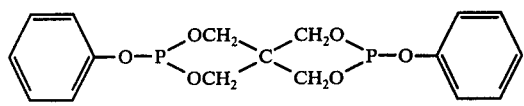

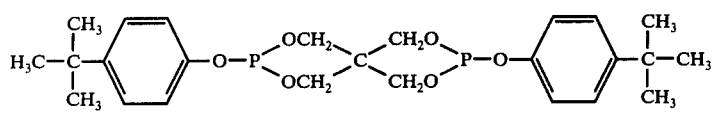

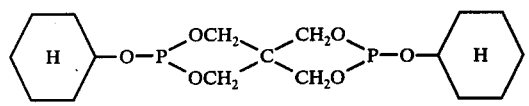

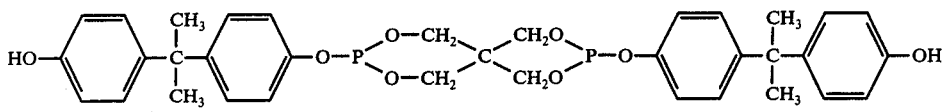

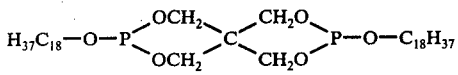

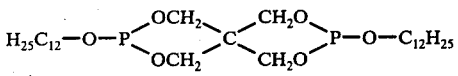

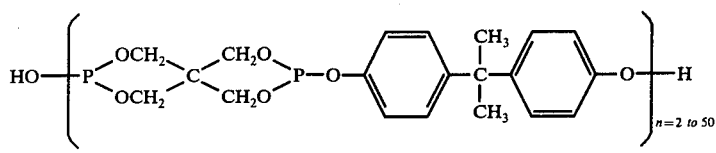

As will be clear from the typical examples described above, the phosphite compound used in this invention includes a phosphite compound represented by the above formula wherein $R_5$ or $R_6$ is a polyhydric phenol residue having 7 to 38 carbon atoms and 1 to 2 hydroxyl groups remaining or a polyhydric alcohol residue having 2 to 22 carbon atoms and 1 to 2 hydroxyl groups remaining, one of the hydroxyl groups of the polyhydric phenol or alcohol residue forming an ester with a terminal phosphorous acid residue of the polycondensate. Examples of such phosphite compound include in addition to the above typical examples a polymer prepared according to, e.g., Synthesis Example 2 below. The phosphite compound shown in Synthesis Example 2 below is a random copolymer composed of two difunctional phenols, pentaerythritol and a phosphite ester.

The above compounds can be prepared, for example, by the methods shown in Synthesis Examples 1 and 2 below.

SYNTHESIS EXAMPLE 1

Pentaerythritol (348 g), 93.4 g of tristearyl phosphite and 0.1% by weight, based on the total amount of the above two compounds, of potassium carbonate as a catalyst were mixed, and then heated (while stirring) at 135° C for 3 hours. The main component of the reaction product had the following structural formula

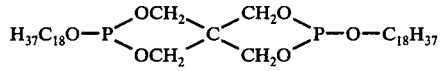

and the phosphorus content of the reaction product was 0.80% by weight.

SYNTHESIS EXAMPLE 2

Triphenyl phosphite (1240 g), 272 g of pentaerythritol, 110 g of hydroquinone, 228 g of 2,2-bis(4-hydroxyphenyl)propane and 0.1% by weight, based on the total weight of the above four compounds, of potassium carbonate as a catalyst were mixed, and then heated (while stirring) at 135° C for 3 hours. Phenol was distilled off at reduced pressure to recover phenol in an amount stoichiometrically required to react with substantially 100% of the triphenyl phosphite. The resulting product was a random polymer containing the following structures (a) and (b) at random. The phosphorus content based on the weight of the polymer was 17.2% by weight.

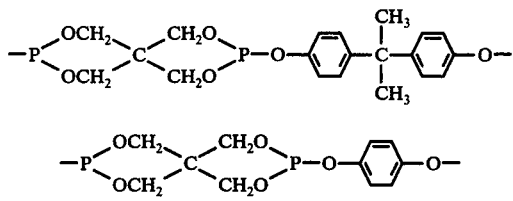

In the present invention, these phosphite compounds can be used either alone or in admixture.

A molded article of an aromatic copolyester derived from a mixture of terephthalic acid and isophthalic acid (the terephthalic acid unit/isophthalic acid unit mole ratio being 1:1) and 2,2-bis(4-hydroxyphenyl)propane which is molded under the conditions of a shaping temperature of 320° C, an injection pressure of 1300 kg/cm$^2$ and a mold temperature of 120° C as described, e.g., in U.S. Pat. No. 3,946,091, is transparent, and has a tensile strength of at least 700 kg/cm$^2$, an Izod impact strength of at least 6 kg-cm/cm$^2$ (thickness 1/2 inch, notched), a bending strength of at least 700 kg/cm$^2$, and a compression strength of at least 900 kg/cm$^2$. When such an article is immersed for 24 hours in boiling water at 100° C, its transparency is lost because of crazing, and its mechanical properties are markedly deteriorated. However, a molded article prepared from an aromatic copolyester composition consisting of the above aromatic copolyester and 0.5% by weight, based on the aromatic copolyester, of the phosphite compound obtained in Synthesis Example 1 above which is molded under the same conditions described above retains the inherent transparency, mechanical properties and fire retardancy of the copolyester, and coloring to yellow brown is inhibited. When this molded article is immersed in hot water at 100° C for 24 hours, no crazing occurs, and the transparency and mechanical properties of the molded article are retained. Furthermore, an aromatic copolyester composition containing such a phosphite compound has superior heat stability to an aromatic copolyester containing no phosphite compound. For example, an injection molded article of the aromatic copolyester per se is progressively colored brown when it is allowed to stand in air at 170° C, and its molecular weight also decreases. However, an injection molded article of the aromatic copolyester containing the phosphite compound does not substantialy color or show a reduction in molecular weight. In addition, the resin composition of this invention is not substantially deteriorated by its heat history during injection molding, etc.

The amount of the phosphite compound incorporated into the aromatic copolyester varies according to the type of the phosphite compound used, and its phosphorus content, but usually, it is about 0.01 to about 10.0% by weight, based on the aromatic copolyester. Crazing can be prevented by adding 0.01% by weight of the phosphite compound, but this effect becomes greater if it is added in an amount of about 0.05% by weight or more. In general, phosphite compounds having a higher phosphorus content are more prone to reduce the fire retardancy of the aromatic copolyester, but if the amount of the phosphite compound is less than about 2.0% by weight, the fire retardancy of the aromatic copolyester is not lowered, irrespective of the type of the phosphite compound used. The addition of about 2.0% by weight or more of the phosphite compound sometimes reduces the fire retardancy of the aromatic copolyester. Furthermore, the addition of about 5% by weight or more of the phosphite compound might adversely affect mechanical properties, such as the impact strength, of the copolyester. The most preferred amount of the phosphite compound is, therefore, 0.05 to 2.0% by weight.

Crazing of the aromatic copolyester can be prevented by adding the phosphite compound. However, the occurrence of crazing can be more positively prevented by jointly adding a metal salt of an organic carboxylic acid. The amount of the metal salt of the organic carboxylic acid is about 0.01 to about 3.0% by weight, preferably 0.05 to 1.0% by weight, based on the aromatic copolyester.

Typical cases are illustrated by specific numerical values, as shown in Table 1 below.

Table 1

| Additive | | | Before treatment | | | | After treatment | | |
|---|---|---|---|---|---|---|---|---|---|
| Type | Amount (%) | Logarithmic viscosity | Color of molded article | Crazing | Tensile impact value (kg-cm/cm$^2$) | Fire retardancy | Logarithmic viscosity | Crazing | Tensile impact value (kg-cm/cm$^2$) |
| None | 0 | 0.61 | 7 | None | 275 | V-I | 0.51 | Considerable | 70 |
| Phosphite compound obtained in Synthesis Example 1 | 0.2 | 0.61 | 3 | None | 255 | V-I | 0.54 | None | 151 |
| Phosphite Compound obtained in Synthesis Example 1 Sodium acetate | 0.2 0.2 | 0.61 | 3.5 | None | 260 | V-I | 0.57 | None | 232 |

The treatment, as referred to herein, means immersion in boiling water at 100° C for 24 hours. The color of the molded article is the degree of coloration rated by numerical values. The higher the number, the higher the degree of coloration. The fire retardancy was evaluated by Subject 94, Underwriters' Laboratories using a one-sixteenth inch thick molded article as a test specimen.

It can be seen from the above table that although the occurrence of crazing can be prevented by adding the phosphite compound above, the effect becomes more certain by adding sodium acetate, for example.

The metal salt of an organic carboxylic acid used for this purpose is a salt formed between an organic carboxylic acid containing 2 to 22 carbon atoms and a metal of Groups I to IV of the Periodic Table. The organic carboxylic acid is a monobasic acid or polybasic acid containing up to 4 carboxyl groups. Of these, monobasic and dibasic carboxylic acids are preferred since they do not cause gelation of the composition. Examples of monobasic acids are acetic acid, propionic acid, n-butyric acid, iso-butyric acid, n-valeric acid, trimethylacetic acid, caproic acid, n-heptanoic acid, caprylic acid, pelargonic acid, lauric acid, stearic acid, fluoroacetic acid, chloroacetic acid, bromoacetic acid, dichloroacetic acid, trichloroacetic acid, chloropropionic acid, glycolic acid, lactic acid, methoxyacetic acid, glyoxylic acid, acrylic acid, phenylacetic acid, benzoic acid, toluic acid, chlorobenzoic acid, bromobenzoic acid, salicylic acid, cinnamic acid, naphthalene monocarboxylic acid, pyridine carboxylic acid, and quinoline carboxylic acid, with acetic acid, stearic acid, benzoic acid or the like being preferred. Examples of the dibasic acids are malonic acid, succinic acid, glutaric acid, adipic acid, suberic acid, azelaic acid, cyclohexane dicarboxylic acid, terephthalic acid, isophthalic acid, and naphthalene dicarboxylic acid with terephthalic acid, isophthalic acid or the like being preferred. Trimellitic acid is an example of a tribasic acid, and pyromellitic acid is an example of a tetrabasic acid. It should be specifically noted in this regard that the type of substituent(s) on the organic carboxylic acid, if such is/are present, is not important, and such can be freely selected without harmfully altering the effect of the carboxylic acid.

The metals forming the carboxylic acid metal salts are those of Groups I to IV of the Periodic Table. Especially preferred metals for use in the present invention are alkali metals such as sodium, potassium and lithium, alkaline earth metals such as magnesium, calcium and barium, and other metals such as zinc, cadmium, tin, and lead. Salts of carboxylic acids with metals other than those of Groups I to IV are not preferred because they have a low effect of preventing crazing and cause heat decomposition of the polymer during melting. In the organic acid salts used in this invention, all the carboxyl groups may be bonded with the metal, or one or more of them may remain as free carboxyl groups without forming the salt.

Any well known mixing techniques can be used to add the phosphite compound with or without the organic carboxylic acid metal salt to the aromatic copolyester. It is merely required that these additives be substantially uniformly admixed with the aromatic copolyester. For example, granules or powders of these components can be mixed and blended using a V-blender, Henschel mixer, Super-mixer or Kneader, and then the mixture immediately molded. Alternatively, the mixture can be formed into pellets after melting by an extruder, a Ko-kneader (manufactured by Buss Co., Ltd., Switzerland), an intensive mixer or the like, and then molded. The pelletizing or molding temperature is generally about 250° C to about 350° C, preferably 260° to 320° C.

Another method of addition comprises adding the phosphite compound with or without the organic carboxylic acid metal salt to a solution of the aromatic copolyester and then evaporating off the solvent. The solvent used for this purpose may be those which dissolve the aromatic copolyester, such as methylene dichloride, tetrachloroethane and chloroform. The methylene dichloride is most preferred.

The optimal method for any particular system is chosen depending on the composition and the desired shape and properties of the molded articles to be produced therefrom.

In order to impart heat resistance, weatherability or oxidation resistance to the composition of this invention, heat decomposition inhibitors, ultraviolet absorbants, and antioxidants may be incorporated therein. For this purpose, phosphorus compounds, benzotriazole compounds, benzophenone compounds and phenolic compounds can be used. Furthermore, plasticizers, pigments, lubricants, and glass fibers may also be incorporated in the composition of this invention.

The aromatic copolyester compositions of this invention can be used to form many useful articles using generally known molding methods such as injection molding, extrusion molding or press molding. Typical examples of the final product obtained by molding are films, monofilaments, and injection molded articles such as machine parts, automobile parts, electrical component parts, vessels and springs. The compositions of this invention also find special use as engineering plastics for various applications which require their excellent properties. The occurrence of crazing in these molded articles upon exposure to hot water or steam for long periods of time is markedly prevented, and the reduction of molecular weight or mechanical strength upon such exposure is also reduced to a slight degree. Furthermore, the molded articles retain the inherent transparency of the aromatic copolyesters.

The following non-limiting Examples illustrate the invention in greater detail. Unless otherwise indicated, all procedures in these examples were performed at atmospheric pressure.

EXAMPLES 1 to 3

450 kg of an aqueous solution of sodium hydroxide having dissolved therein 22.5 kg of 2,2-bis(4-hydroxyphenyl) propane was mixed with 292 kg of a solution of methylene chloride having dissolved therein 10 kg of isophthaloyl dichloride and 10 kg of terephthaloyl dichloride with stirring. After the completion of the reaction, the aqueous phase was separated from the organic phase. The organic phase was then washed four times with pure water, and concentrated. The methylene chloride was distilled off to provide a powdery aromatic copolyester which was found to have a logarithmic viscosity of 0.67 as determined in phenol/tetrachloroethane (weight ratio 6/4) at 25° C (C=1 g/dl).

There was then added to the powdery aromatic copolyester obtained 0.5% by weight, based on the aromatic copolyester, of each of the three phosphite compounds shown in Table 2 by blending in a super-mixer (manufactured by Kawata Seisakusho), and then drying in vacuo. The blend was then formed into chips in an extruder. The chips obtained were of good quality.

The chips were dried and molded into test pieces using an injection molding machine. The molded articles were dried, and some of them stored in air at 170° C for 240 hours. The remainder of the molded articles were stored in air at 85° C and RH 95% for 240 hours.

The results obtained are shown in Table 2. It can be seen from the results that the compositions of this invention exhibit marked effects as compared with the aromatic copolyester not containing any phosphite compound.

Table 2

| Example | Additive Type | Additive Amount (wt.%) | In air at 170° C for 240 hours | | | | In air at 85° C and RH 95% for 240 hours | | | | Occurrence of crazing |
|---|---|---|---|---|---|---|---|---|---|---|---|
| | | | Before treatment ηinh | Before treatment Coloration | After treatment ηinh | After treatment Coloration | Before treatment ηinh | Before treatment Coloration | After treatment ηinh | After treatment Coloration | |
| Control | None | 0 | 0.59 | 7 | 0.56 | 10 | 0.59 | 7 | 0.48 | 9 | Considerable |
| Example 1 | P-1 | 0.5 | 0.66 | 3 | 0.65 | 3 | 0.66 | 3 | 0.64 | 3 | None |
| Example 2 | P-2 | 1.5 | 0.65 | 3 | 0.63 | 3 | 0.65 | 3 | 0.61 | 3 | None |
| Example 3 | P-3 | 0.5 | 0.63 | 3 | 0.61 | 3 | 0.63 | 3 | 0.58 | 3 | None |

P-1: 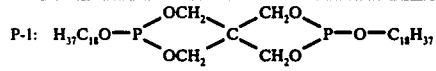

P-2: 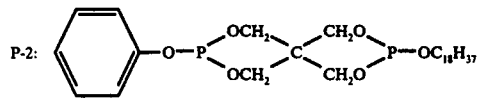

P-3: 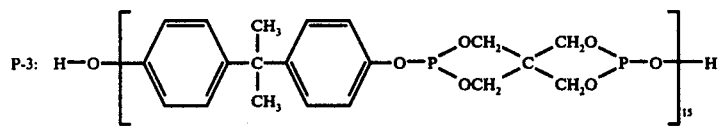

The numbers showing the degrees of coloration mean the following.
- 3: pale yellow
- 5: yellow
- 7: light brown
- 9: brown

EXAMPLES 4 to 9

To an aromatic copolyester the same as was used in Examples 1 to 3 was added the phosphite compound (P-1) in an amount of 0.01, 0.05, 0.1, 0.5, 1.0, 2.0, and 5.0% by weight, respectively, based the weight of the aromatic copolyester. The mixture was dried and then formed into chips by an extruder. The chips were molded into test pieces by means of an injection molding machine. Various properties of the test pieces were measured, and the results are shown in Table 3. It can be seen from the results obtained that the phosphite compound is effective even when it is added in an amount of 0.01% by weight, but amounts of 0.05 to 2.0% by weight are especially preferred.

copolyester. To the resulting dope there was added 1.0% by weight, based on the aromatic copolyester, of a phosphite compound of the following formula

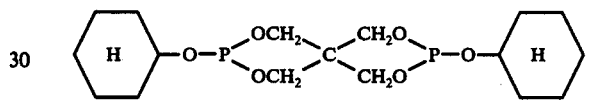

and the system well mixed. The methylene chloride was then gradually distilled off, and the residue pulverized by a kneader to form an aromatic copolyester containing the phosphite compound. The resulting granular aromatic copolyester composition was dried and stored in air at 170° C for 240 hours. Separately, another sample of the composition was stored in steam at 80° C and RH 95% for 240 hours.

For comparison, the same tests as above were performed on a granular aromatic copolyester obtained by the same procedure as above except that the phosphite compound was not added. The results are shown in Table 4.

It can be seen from the results that the aromatic co-

Table 3

| Example | Amount (wt.%) | Before immersion in hot water at 100° C for 24 hours | | | After immersion in hot water at 100° C for 24 hours | | Occurrence of crazing |
|---|---|---|---|---|---|---|---|
| | | Color of the molded article | ηinh | Tensile impact strength (kg-cm/cm²) | ηinh | Tensile impact strength (kg-cm/cm²) | |
| Control | 0 | 7 | 0.60 | 280 | 0.54 | 70 | Considerable |
| Example 4 | 0.01 | 4 | 0.62 | 270 | 0.61 | 140 | None |
| Example 5 | 0.05 | 3 | 0.63 | 270 | 0.61 | 170 | None |
| Example 6 | 0.1 | 3 | 0.63 | 270 | 0.62 | 190 | None |
| Example 1 | 0.5 | 3 | 0.64 | 270 | 0.63 | 190 | None |
| Example 7 | 1.0 | 3 | 0.64 | 260 | 0.62 | 170 | None |
| Example 8 | 2.0 | 3 | 0.64 | 260 | 0.62 | 170 | None |
| Example 9 | 5.0 | 3 | 0.62 | 220 | 0.60 | 120 | None |

EXAMPLE 10

5.5 kg of an aqueous solution of sodium hydroxide having 2.75 kg of 2,2-bis(4-hydroxyphenyl)propane dissolved therein, 1.45 kg of terephthaloyl dichloride, 0.97 kg of isophthaloyl dichloride and 25 liters of methylene chloride were subjected to interfacial polymerization to form a methylene chloride dope of an aromatic polyester not containing the phosphite compound developed crazing when stored in steam at 80° C and RH 95% for 240 hours, and its logarithmic viscosity markedly decreased. When it was stored in air at 170° C for 240 hours, its logarithmic viscosity also greatly decreased, and it colored to a considerable degree. On the other hand, the stabilized aromatic copolyester composition of this invention did not develop crazing nor did its viscosity decrease even when stored in steam at 80° C and RH 95% for 240 hours. The decrease of the logarithmic viscosity and the degree of coloration were small even when it was stored in air at 170° C for 240 hours.

acetone was added, and the mixture dried to obtain a flaky polymer. The polymer had a logarithmic viscosity (measured at 25° C in a 6/4 (by weight) mixture of phenol/tetrachloroethane at a polymer concentration of 1 g/dl) of 0.65.

The polymer flakes obtained were admixed with each

Table 4

| Example | Additive Type | Additive Amount | After treatment at 170° C for 240 hours | | | After treatment at 80° C and RH 95% for 240 hours | | |
|---------|------|--------|-------------------|------------------|--------------------------|-------------------|------------------|----------------------|
|         |      |        | ηinh before treatment | ηinh after treatment | Coloration after treatment | ηinh before treatment | ηinh after treatment | Occurrence of crazing |
| Control | None | 0      | 0.63 | 0.52 | 7 | 0.63 | 0.50 | Considerable |
| Example 10 | P-4 | 1.0 | 0.63 | 0.61 | 3 | 0.63 | 0.61 | None |

P-4 is the following compound.

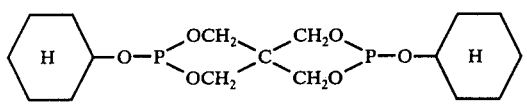

EXAMPLES 11 to 39

2,030 parts by weight of terephthaloyl dichloride and 2,030 parts by weight of isophthaloyl dichloride were dissolved at 20° C in 65,000 parts by weight of methylene chloride. Separately, 4,560 parts by weight of 2,2-bis(4-hydroxyphenyl) propane, 1,680 parts by weight of sodium hydroxide, 60 parts by weight of p-tert-butylphenol and 23 parts by weight of trimethyl benzyl ammonium chloride were dissolved at 20° C in 100,000 parts by weight of water. The two solutions were mixed in a reaction tank equipped with a homomixer with vigorous stirring. The reaction temperature was 20° C, and the stirring time was 5 hours. Stirring was then stopped, and the methylene chloride phase separated and washed with deionized water until the wash water became neutral. Then, an equal amount (by volume) of of the various carboxylic acid metal salts and each of the phosphite compounds shown in Table 5. The mixtures were each sufficiently dried, and melt extruded into chips. The chips were injection molded to form molded articles. The color and fire retardancy of the molded articles were determined. The molded articles were also treated in boiling water at 100° C for 24 hours, and the occurrence of craze, the changes in average molecular weight reflected by changes in logarithmic viscosity, and the changes in mechanical strength in the samples were determined before and after the treatment. The results are shown in Table 5.

The phosphite compounds designated by abbreviations were as follows (except those already mentioned hereinabove):

P-5: The random copolymer obtained in Synthesis Example 2 above.

P-6:

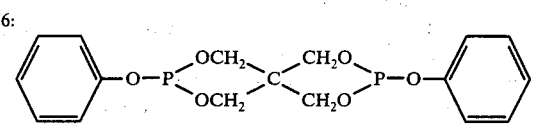

Table 5

| Example | Additives Type | Additives Amount (wt.%) | Before treatment | | | | | After treatment | | |
|---------|------|--------|------------------|----------------|-----------------|-----------------------|---------------|------------------|---------------------|-----------------------|
|         |      |        | Logarithmic viscosity | Color of the molded article | Occurrence of crazing | Tensile impact (Kg-cm/cm²) | Fire retardancy | Logarithmic viscosity | Occurrence of crazing | Tensile impact (Kg-cm/cm²) |
| Control | None | 0 | 0.61 | 7 | None | 275 | V-I | 0.51 | Remarkable | 70 |
| 11 | P-1 | 0.01 | 0.61 | 2 | None | 255 | V-I | 0.54 | Slightly occurred | 151 |
| 12 | Sodium acetate | 0.2 | 0.61 | 2.5 | None | 260 | V-I | 0.57 | None | 232 |
|    | P-1 | 0.1 | | | | | | | | |
| 13 | Sodium acetate | 3.0 | 0.60 | 4.5 | None | 246 | V-I | 0.54 | None | 179 |
|    | P-1 | 0.1 | | | | | | | | |
| 14 | Sodium acetate | 0.2 | 0.60 | 1.5 | None | 240 | V-II | 0.54 | None | 190 |
|    | P-1 | 2.0 | | | | | | | | |
| 15 | Sodium acetate | 0.2 | 0.61 | 2.5 | None | 263 | V-I | 0.56 | None | 240 |
|    | P-6 | 0.1 | | | | | | | | |
| 16 | Sodium acetate | 0.2 | 0.61 | 2.0 | None | 247 | V-I | 0.56 | None | 235 |
|    | P-5 | 0.1 | | | | | | | | |
| 17 | Calcium stearate | 0.2 | 0.61 | 2.5 | None | 265 | V-I | 0.57 | None | 217 |
|    | P-1 | 0.1 | | | | | | | | |
| 18 | Calcium stearate | 0.2 | 0.61 | 2.5 | None | 250 | V-I | 0.57 | None | 220 |
|    | P-6 | 0.1 | | | | | | | | |
| 19 | Calcium stearate | 0.2 | 0.61 | 2.5 | None | 263 | V-I | 0.57 | None | 234 |
|    | P-4 | 0.1 | | | | | | | | |
| 20 | Calcium stearate | 0.2 | 0.61 | 2.5 | None | 250 | V-I | 0.56 | None | 220 |

Table 5-continued

| Example | Additives Type | Amount (wt.%) | Before treatment Logarithmic viscosity | Color of the molded article | Occurrence of crazing | Tensile impact (Kg-cm/cm²) | Fire retardancy | After treatment Logarithmic viscosity | Occurrence of crazing | Tensile impact (Kg-cm/cm²) |
|---|---|---|---|---|---|---|---|---|---|---|
| 21 | P-3<br>Calcium stearate | 0.1<br>0.2 | 0.61 | 2.0 | None | 247 | V-I | 0.55 | None | 213 |
| 22 | P-5<br>Sodium stearate | 0.1<br>0.2 | 0.61 | 2.5 | None | 263 | V-I | 0.56 | None | 220 |
| 23 | P-1<br>Potassium stearate | 0.1<br>0.2 | 0.61 | 2.5 | None | 260 | V-I | 0.57 | None | 215 |
| 24 | P-1<br>Magnesium stearate | 0.1<br>0.2 | 0.61 | 2.5 | None | 254 | V-I | 0.57 | None | 230 |
| 25 | P-1<br>Barium stearate | 0.1<br>0.2 | 0.61 | 2.5 | None | 270 | V-I | 0.56 | None | 210 |
| 26 | P-1<br>Zinc stearate | 0.1<br>0.2 | 0.61 | 2.5 | None | 250 | V-I | 0.55 | None | 204 |
| 27 | P-1<br>Calcium stearate | 0.1<br>3.0 | 0.60 | 4.0 | None | 240 | V-I | 0.54 | None | 191 |
| 28 | P-1<br>Calcium stearate | 0.1<br>0.2 | 0.60 | 2.0 | None | 242 | V-II | 0.55 | None | 187 |
| 29 | P-1<br>Calcium stearate | 2.0<br>3.0 | 0.60 | 4.0 | None | 235 | V-I | 0.54 | None | 200 |
| 30 | P-5<br>Calcium stearate | 0.1<br>0.2 | 0.60 | 2.0 | None | 245 | V-II | 0.55 | None | 210 |
| 31 | P-5<br>Sodium benzoate | 2.0<br>0.2 | 0.61 | 2.5 | None | 268 | V-I | 0.57 | None | 242 |
| 32 | P-1<br>Sodium benzoate | 0.1<br>0.2 | 0.61 | 2.0 | none | 245 | V-I | 0.57 | None | 230 |
| 33 | P-5<br>Calcium benzoate | 0.1<br>0.2 | 0.61 | 2.5 | None | 240 | V-I | 0.57 | None | 213 |
| 34 | P-1<br>Calcium benzoate | 0.1<br>0.2 | 0.61 | 2.5 | None | 250 | V-I | 0.56 | None | 207 |
| 35 | P-6<br>Sodium terephthalate | 0.1<br>0.2 | 0.61 | 3.0 | None | 260 | V-I | 0.56 | None | 215 |
| 36 | P-1<br>Sodium terephthalate<br>P-5 | 0.1<br>0.2<br>0.1 | 0.61 | 2.5 | None | 242 | V-I | 0.57 | None | 255 |

The tensile impact strength is expressed in Kg-cm/cm². Fire retardancy evaluation was performed on a one-sixteenth inch thick molded article in accordance with Subject 94 of the Underwriters' Laboratories. The amounts of the additives are based on the weight of the aromatic copolyester.

It can be seen from the results obtained with the control run that where the aromatic copolyester does not contain the specific additives of the present invention, considerable crazing occurs upon immersion in hot water. The results shown in Table 5 demonstrate that the joint use of the phosphate compound and the organic carboxylic acid metal salt provides a reduction in crazing while retaining excellent fire retardancy, and also reduces the degree of coloration of the molded article, as compared with the use of the phosphite compound alone.

When the amount of the organic carboxylic acid metal salt was increased beyond the earlier specified range, coloration of the molded article increased. If the amount of the phosphite compound is increased, coloration of the molded article can be inhibited, but its fire retardancy is reduced.

While the invention has been described in detail and with reference to specific embodiments thereof, it will be apparent to one skilled in the art that various changes and modifications can be made therein without departing from the spirit and scope thereof.

What is claimed is:

1. A resin composition consisting essentially of:
   (A) an aromatic copolyester derived from (a) a mixture of terephthalic acid and/or its functional derivative and isophthalic acid and/or its functional derivative, with the terephthalic acid unit/isophthalic acid unit mole ratio being about 9:1 to about 1:9, and (b) 2,2-bis(4-hydroxyphenyl)propane, or its functional derivative, and
   (B) a phosphite compound of the general formula

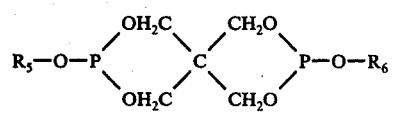

wherein $R_5$ and $R_6$, independently from each other, represent a hydrogen atom, an alkyl group having 1 to 22 carbon atoms, an aryl group having 6 to 16 carbon atoms, a cycloalkyl group having 6 to 12 carbon atoms, an arylalkyl group having 7 to 38 carbon atoms, an alkylaryl group having 7 to 38 carbon atoms a polyhydric phenol residue having 7 to 38 carbon atoms and 1 to 2 hydroxyl groups remaining, or a polyhydric alcohol residue having 2 to 22 carbon atoms and 1 to 2 hydroxyl groups remaining, or such residues where at least one of the hydroxyl groups is in the form of a phosphite ester.

2. The composition of claim 1 wherein the mole ratio of the terephthalic acid unit to the isophthalic acid unit is 7:3 to 3:7.

3. The composition of claim 1 wherein the mole ratio of the terephthalic acid unit to the isophthalic acid unit is 1:1.

4. The composition of claim 1 wherein the amount of the phosphite compound is about 0.01 to about 10% by weight based on the weight of the aromatic copolyester.

5. The composition of claim 4 wherein the amount of the phosphite compound is 0.01 to 5% by weight based on the weight of the aromatic copolyester.

6. The composition of claim 5 wherein the amount of the phosphite compound is 0.05 to 2.0% by weight based on the weight of the aromatic copolyester.

7. The composition of claim 1 wherein the phosphite compound is

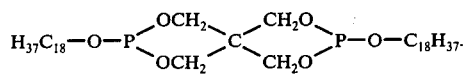

8. The composition of claim 7 wherein the mole ratio of the terephthalic acid units to the isophthalic acid units is 1:1.

9. A resin composition consisting essentially of
(A) an aromatic copolyester derived from (a) a mixture of terephthalic acid and/or its functional derivative and isophthalic acid and/or its functional derivative, with the terephthalic acid unit/isophthalic acid unit mole ratio being about 9:1 to about 1:9, and (b) 2,2-bis(4-hydroxyphenyl)propane, or its functional derivative,
(B) a phosphite compound of the general formula

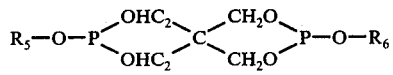

wherein $R_5$ and $R_6$, independently from each other, represent a hydrogen atom, an alkyl group having 1 to 22 carbon atoms, an aryl group having 6 to 16 carbon atoms, a cycloalkyl group having 6 to 12 carbon atoms, an arylalkyl group having 7 to 38 carbon atoms, an alkylaryl group having 7 to 38 carbon atoms, a polyhydric phenol residue having 7 to 38 carbon atoms and 1 to 2 hydroxyl groups remaining, or a polyhydric alcohol residue having 2 to 22 carbon atoms and 1 to 2 hydroxyl groups remaining, or such residues where at least one of the hydroxyl groups is in the form of a phosphite ester, and
(C) a salt formed between an organic carboxylic acid containing 2 to 22 carbon atoms and a metal of Groups I, II, III and IV of the Periodic Table.

10. The composition of claim 9 wherein the mole ratio of the terephthalic acid units to the isophthalic acid units is 7:3 to 3:7.

11. The composition of claim 9 wherein the mole ratio of the terephthalic acid unit to the isophthalic acid unit is 1:1.

12. The composition of claim 9 wherein the amount of the phosphite compound is about 0.01 to about 10% by weight based on the weight of the aromatic copolyester.

13. The composition of claim 12 wherein the amount of the phosphite compound is 0.01 to 5% by weight of the aromatic copolyester.

14. The composition of claim 13 wherein the amount of the phosphite compound is 0.05 to 2.0% by weight based on the weight of the aromatic copolyester.

15. The composition of claim 9 wherein the amount of the organic carboxylic acid metal salt is about 0.01 to about 3.0% by weight based on the weight of the aromatic copolyester.

16. The composition of claim 15 wherein the amount of the organic carboxylic acid metal salt is 0.05 to 1.0% by weight based on the weight of the aromatic copolyester.

17. The composition of claim 9 wherein the amount of the phosphite compound is 0.05 to 2.0% by weight, and the amount of the organic carboxylic acid metal salt is 0.05 to 1.0% by weight, both based on the weight of the aromatic copolyester.

18. The composition of claim 9 wherein the phosphite compound is

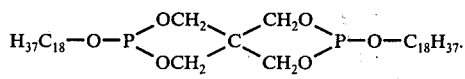

19. The composition of claim 9 wherein the organic carboxylic acid is acetic acid.

20. The composition of claim 9 wherein the organic carboxylic acid is stearic acid.

21. The composition of claim 9 wherein the organic carboxylic acid is benzoic acid.

22. The composition of claim 18 wherein the mole ratio of the terephthalic acid units to the isophthalic acid units is 1:1, and the salt is calcium stearate.

23. The composition of claim 18 wherein the mole ratio of the terephthalic acid unit to the isophthalic acid unit is 1:1, and the salt is sodium acetate.

24. The composition of claim 9, wherein said metal is selected from the group consisting of sodium, potassium, lithium, magnesium, calcium, barium, zinc, cadmium, tin and lead.

25. A molded article produced from the composition of claim 1.

26. A molded article produced from the composition of claim 8.

27. A molded article produced from the composition of claim 9.

28. A molded article produced from the composition of claim 22.

29. A molded article produced from the composition of claim 23.

* * * * *